United States Patent
Kotary et al.

(10) Patent No.: US 10,430,589 B2
(45) Date of Patent: Oct. 1, 2019

(54) DYNAMIC FIRMWARE MODULE LOADER IN A TRUSTED EXECUTION ENVIRONMENT CONTAINER

(71) Applicant: Intel Corporation, Santa Clara, CA (US)

(72) Inventors: Karunakara Kotary, Portland, OR (US); Vincent J. Zimmer, Federal Way, WA (US); Scott D. Brenden, Hillsboro, OR (US); Jose Benchimol, Haifa (IL); Panner Kumar, Bangalore (IN); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 14/662,415

(22) Filed: Mar. 19, 2015

(65) Prior Publication Data

US 2016/0275290 A1     Sep. 22, 2016

(51) Int. Cl.
  *G06F 21/57*     (2013.01)
  *G06F 21/74*     (2013.01)

(52) U.S. Cl.
  CPC ............ *G06F 21/575* (2013.01); *G06F 21/74* (2013.01)

(58) Field of Classification Search
  CPC .......................... G06F 21/575; G06F 9/4401
  See application file for complete search history.

(56) References Cited

U.S. PATENT DOCUMENTS

| | | | |
|---|---|---|---|
| 7,984,286 B2 | 7/2011 | Zimmer et al. | |
| 8,984,265 B2 | 3/2015 | Vaid et al. | |
| 9,189,653 B2 | 11/2015 | Thom et al. | |
| 9,317,702 B2 | 4/2016 | Andersson et al. | |
| 2001/0052069 A1* | 12/2001 | Sekiguchi | G06F 9/4416 713/2 |
| 2003/0061494 A1* | 3/2003 | Girard | G06F 21/57 713/189 |
| 2004/0103299 A1* | 5/2004 | Zimmer | G06F 21/57 726/26 |
| 2007/0300051 A1* | 12/2007 | Rothman | G06F 8/65 713/1 |
| 2008/0244257 A1* | 10/2008 | Vaid | H04L 9/0827 713/2 |

(Continued)

OTHER PUBLICATIONS

PCT Search Report and Written Opinion issued in corresponding PCT/US2016/018413 dated May 26, 2016 (10 pages).

(Continued)

*Primary Examiner* — Thomas C Lee
*Assistant Examiner* — Gary Collins

(57) ABSTRACT

A dynamic firmware module loader loads one of a plurality of a firmware contexts or modules as needed in a containerized environment for secure isolated execution. The modules, called applets, may be loaded and unloaded in a firmware context. The loader may use a hardware inter process communication channel (IPC) to communicate with the secure engine. The modules may be designed to implement specific features desired by basic input/output system vendors, without the use of a system management mode. Designed modules may provide necessary storage and I/O access driver capabilities to be run in trusted execution environment containers.

24 Claims, 4 Drawing Sheets

(56) References Cited

U.S. PATENT DOCUMENTS

| | | | |
|---|---|---|---|
| 2011/0161648 A1* | 6/2011 | Ekberg | G06F 21/575 713/2 |
| 2012/0331550 A1 | 12/2012 | Raj | |
| 2013/0007470 A1* | 1/2013 | Violleau | G06F 21/54 713/193 |
| 2013/0031374 A1* | 1/2013 | Thom | G06F 21/57 713/189 |
| 2013/0268997 A1 | 10/2013 | Clancy, III | |
| 2014/0250293 A1* | 9/2014 | Long | G06F 9/4401 713/2 |
| 2014/0283103 A1* | 9/2014 | Loisel | G06F 12/14 726/26 |
| 2014/0298003 A1* | 10/2014 | Ali | G06F 9/45558 713/2 |
| 2014/0380031 A1 | 12/2014 | Jones et al. | |
| 2015/0193224 A1* | 7/2015 | Ziat | G06F 8/65 717/172 |
| 2015/0220729 A1* | 8/2015 | Rudolph | G06F 8/67 726/27 |
| 2016/0007265 A1 | 1/2016 | Xiu | |

OTHER PUBLICATIONS

Supplementary EP Search report in corresponding EP application No. 16765391.4-1218 I 3271818 dated Oct. 5, 2018 (11 pages).
European Patent Office, Communication pursuant to Article 94(3) EPC dated Aug. 8, 2019 in European Patent Application No. 16765391.4.
European Patent Office, Communication pursuant to Article 94(3) EPC dated May 10, 2019 in European Patent Application No. 16765391.4.

* cited by examiner

DYNAMIC FIRMWARE MODULE LOADER IN A TRUSTED EXECUTION ENVIRONMENT CONTAINER

BACKGROUND

Various mechanisms exist for secure booting. The unified extensible firmware interface (UEFI) specification defines a model for the interface between operating systems and platform firmware. That interface uses data tables that contain platform-related information, plus boot and run time service calls that are available in the operating system loader. Together these provide a standard environment for booting an operating system and running pre-boot applications. More information about UEFI may be found on the Internet at URL www*uefi*org/home where periods have been replaced with asterisks to prevent inadvertent hyperlinks. The UEFI standard may be used to assist with secure boot of the platform.

Currently different original equipment manufacturers and basic input/output system (BIOS) venders implement different variations of the UEFI firmware. Many of these implementations rely on a system management mode (SMM) feature.

System-on-a-chip based systems use access controlled resources and data that are mainly managed under the control of an inband agent such as UEFI via SMM. Examples include platform UEFI variables, motion energy image (MEI) numbers, medium access control (MAC) address, and various device calibration data which are access controlled data elements of the platform and which need to be managed securely.

BRIEF DESCRIPTION OF THE DRAWINGS

Some embodiments are described with respect to the following figures.

DETAILED DESCRIPTION

A dynamic firmware module loader loads one of a plurality of a firmware contexts or modules as needed. The modules, called applets, may be loaded and unloaded in a firmware context. A dynamic application loader (DAL), available from Intel Corporation, is one example of a dynamic firmware module loader. The module loader may use a hardware inter process communication (IPC) channel such as host embedded controller interface (HECI) or a software inter process communication channel to communicate with a secure engine such as a manageability engine. The modules may be designed to implement specific features desired by basic input/output system vendors or original equipment manufacturers, without the use of a system management mode in host main processor.

The vendor specific patch work of custom UEFI firmware exposes security holes. This can result in device recall to the UEFI vendor as well as exposing the users to vulnerabilities. In addition, the SMM capability in system-on-a-chip applications increases cost due to the need for an additional gate, and/or logic and enabling and/or validation efforts. SMM also bypasses an operating system's security. In addition, the different vendor specific implementations of the UEFI firmware require firmware support for many different types of firmware storage. This creates a maintainability burden across the array of vendors having various UEFI firmware customizations.

Containerization refers to ability to isolate or partition firmware modules from one another so that if one module has an issue, the other modules are not affected as well.

In accordance with some embodiments, UEFI capabilities may be run as an isolated dynamic application loader applet containerized inside a trusted execution environment. In some specific embodiments, UEFI capabilities may include variable management and secure boot logic. As used herein, a trusted execution environment or TEE is a secure area implemented in a processor to ensure that sensitive data can be stored and processed in a way that ensures confidentiality and integrity of data. A manageability engine is one example of a TEE.

In order to implement this mechanism, the UEFI code of each vendor is migrated to a containerized TEE environment in a platform chipset to reduce the attack surface from malicious users. The vendor specific vulnerable code is containerized and isolated to reduce the risk of compromising an entire system or user sensitive data.

A scalable hardware inter process communication (IPC) channel interface between the TEE and processor cores may have no requirement for and/or dependency on use of SMM hardware. A TEE application program interface (API) can provide generic, consistent interfacing for vendor specific modules that run inside this containerized environment.

The TEE abstracts the UEFI storage on the platform boot media. This allows many different types of storage to be used without a requirement that the UEFI firmware have multiple storage drivers.

Figure 1:
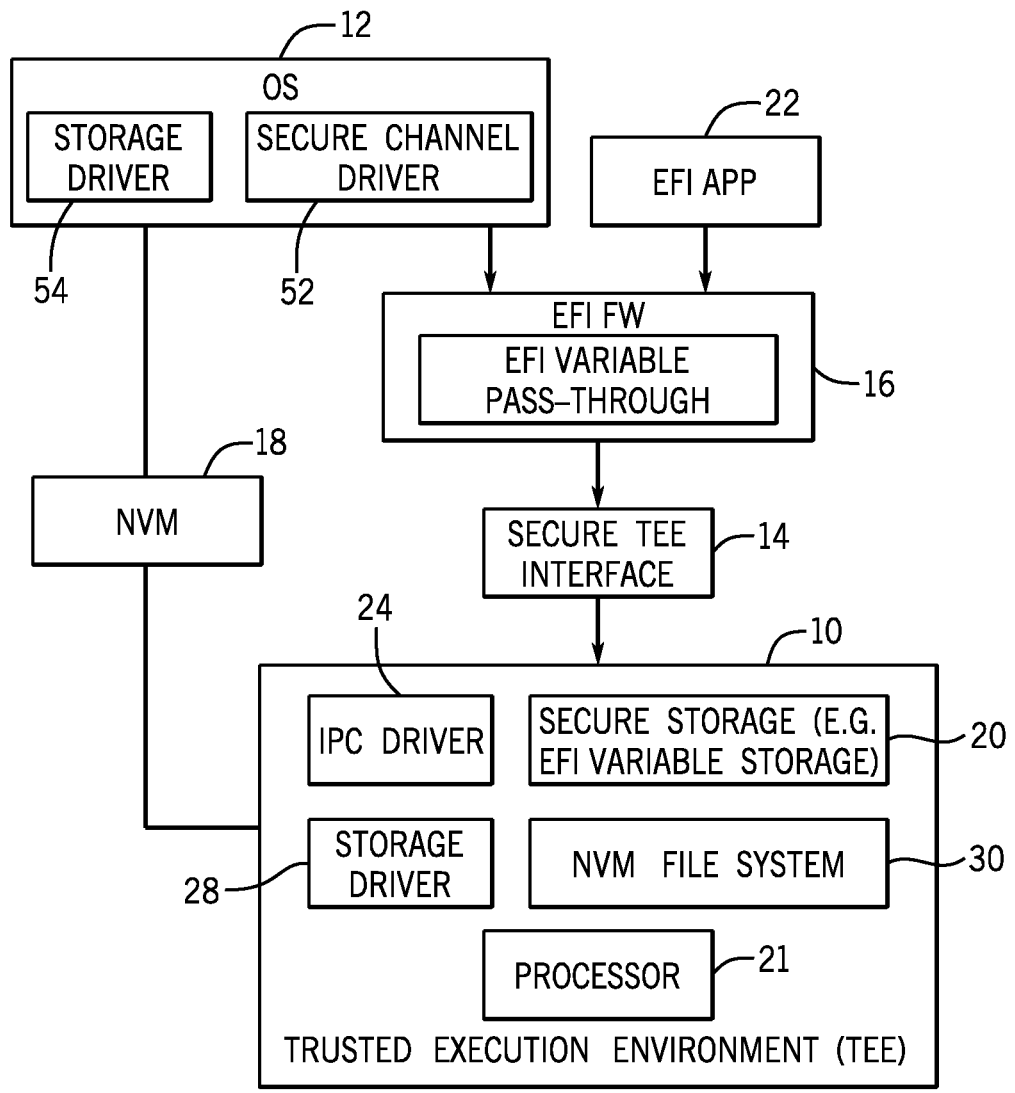
FIG. 1 is a system architecture for one embodiment.

In FIG. 1, a UEFI variable implementation is given as an example. The UEFI variables are heavily used in operating systems, such as Windows, Android and other Linux operating systems, to store shared sensitive data such as platform specific data required for secure boot and recovery between UEFI firmware and operating system services. But other applications may also use the same mechanism.

The TEE has its own dedicated, isolated memory 20 that is accessed by its internal processor 21. This is because that TEE processor and other external processors may be unable to share the same memory. The TEE has its own memory that is hidden and is only operated on by the TEE's own processor. The internal TEE memory is not accessible by entities outside the TEE.

The TEE 10 dedicates UEFI firmware requested non-volatile memory space on the platform boot media or non-volatile memory (NVM) 18. The TEE is a dedicated, isolated execution environment. The TEE firmware implements a UEFI variable wrapper with a secure interface 14 to the host operating system (OS) 12 and has EFI variable secure storage 20, storage driver 28 and file system 30 inside the TEE. That storage identifies free space, maps the variable to non-volatile memory 18 space, enables fault tolerant write service, enables EFI specification mandated verification/authentication and reading/writing to the reserved non-volatile memory area 20, for example for EFI variables as needed by EFI applications 22.

The TEE supports a secure non-volatile memory file system 30 and non-volatile memory data service. It either directly touches the storage hardware 18 before an operating system is running or relies on operating system 12 entities (i.e. storage driver 54 and secure channel driver 52) to proxy the storage access while the operating system is running. The TEE may support the EFI specification to find a secure variable service that follows RSA20448/SHA256/PKCS 1.5 signature verification of the non-volatile memory data being written. The platform has an inter process communication channel interface 14 with the TEE, to pass the parameter information to the TEE using an IPC driver 24. The EFI firmware 16 is just a variable pass through. The TEE copies the contents from the platform visible memory 18 to secure/isolated memory 20 within the TEE and performs authentication/verification on the data before performing non-volatile memory transactions.

Figure 2:
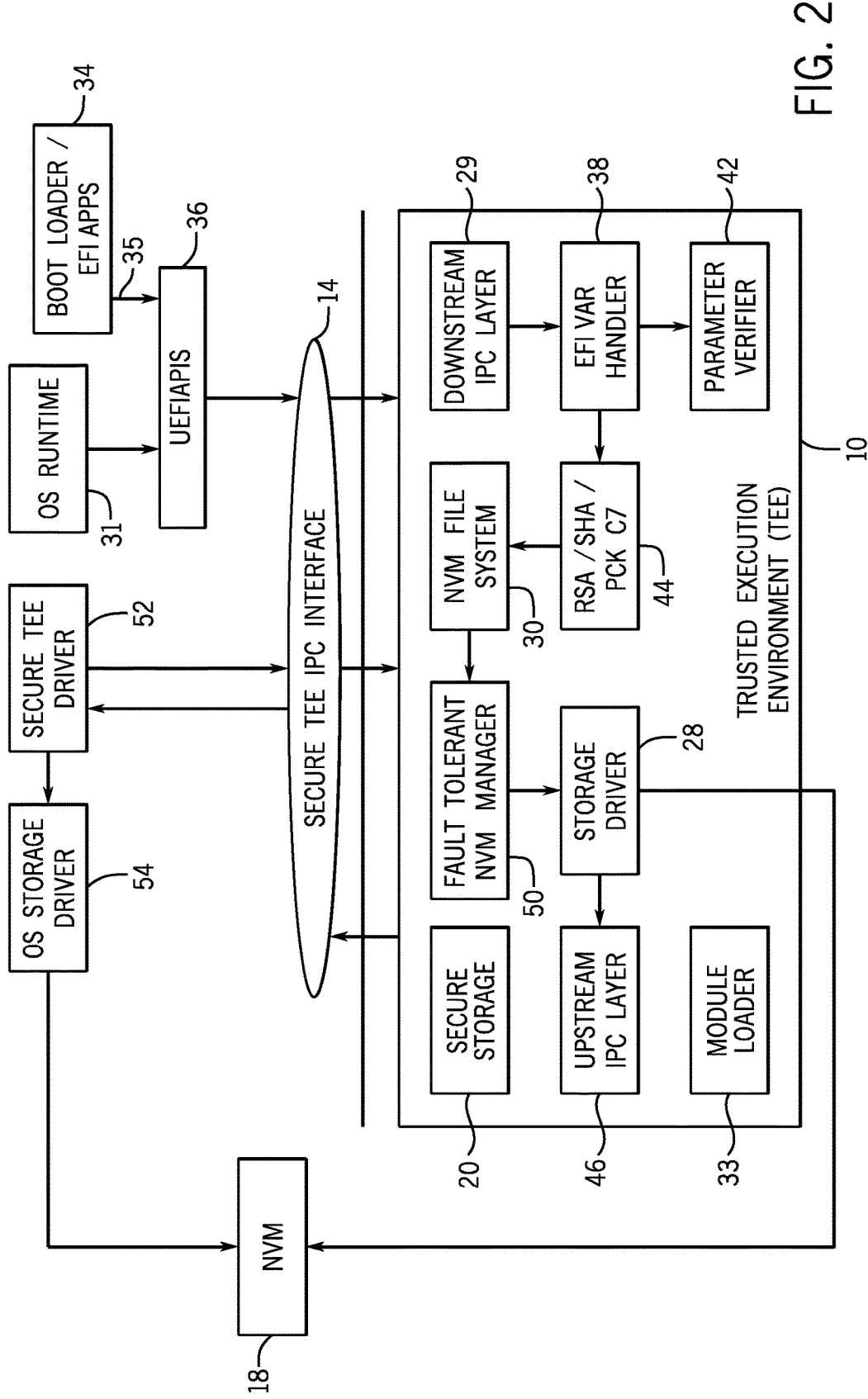
FIG. 2 is an operational flow across system level components for one embodiment.

FIG. 2 shows an operational sequence across system components for the UEFI variable storage example described above. The dynamic firmware module loader 33 loads applets or modules 28, 29, 38, 42, 44 and 46. As indicated at 35, the UEFI boot loader 34 calls the UEFI SetVariable/GetVariable. The UEFI applications 36 then issue an inter process communication channel 14 to the TEE 10 to offload the UEFI variable service. Then the TEE storage driver 28 handles the downstream inter process communication channel 14.

The TEE EFI variable handler 38 copies all the parameters passed from the platform accessible memory 18 to the TEE's isolated secure memory 20. The parameter verifier 42 cross verifies all EFI variable parameters, and makes sure the EFI variable is accessible for the current execution context.

The crypto block 44 invokes the EFI specification mandated security check, if the variables are of the type "security check." Then the TEE invokes its non-volatile memory file system block 30 to read/write an EFI variable blob. An OEM or BIOS vendor can write any modules or applets it desires, to provide vendor specific features including enabling the use of different storage technologies. The modules may use Replay Protection Memory Block (RPMB) in one case and Serial Peripheral Interface NOR memory (SPINOR) in another case, implemented by calling different modules for the different function under particular circumstances. Other storage types can also be used. One can write any module to support desired functions in a selected storage type and that module implements that function when needed and acts like the file manager for that storage.

Next a non-volatile memory file system manager 30 kicks a fault tolerant non-volatile memory manager 50 to ensure data is persistently stored in a way that ensures consistency across power failure scenarios. For example, a module may ensure that it reads the correct current values. Default values may be stored at a known location as a rollback mechanism. Then updated values may be used to update new settings. If an update fails, the rollback mechanism can be used. The module could alternately use two partitions to write the data so that if corruption is detected in one partition and the backup partition can be read.

The OS loader loads the OS runtime 31 and calls EXITBOOTSERVICE, which transfers control from firmware to the operating system. If the EFI execution context is still before EXITBOOTSERVICE Serial Peripheral Interface NOR Memory or (SPINOR) or multi-headed storage is available, then the TEE storage driver 28 directly updates the non-volatile memory 18. However if the EFI execution context is still after EXITBOOTSERVICE, its storage is single-headed and the UEFI variable storage is not Serial Peripheral Interface NOR Memory (SPINOR), then the TEE triggers an upstream inter process communication channel layer 46 to the secure TEE driver 52. The driver 52 works with the TEE to grab the signed data blob and call the operating system storage driver 54 services to access the storage media 18.

Then the driver 52 provides the access result back to the TEE via a downstream inter process channel layer 29. Finally the TEE updates the EFI application 36 on the result availability and EFI returns.

Figure 3:
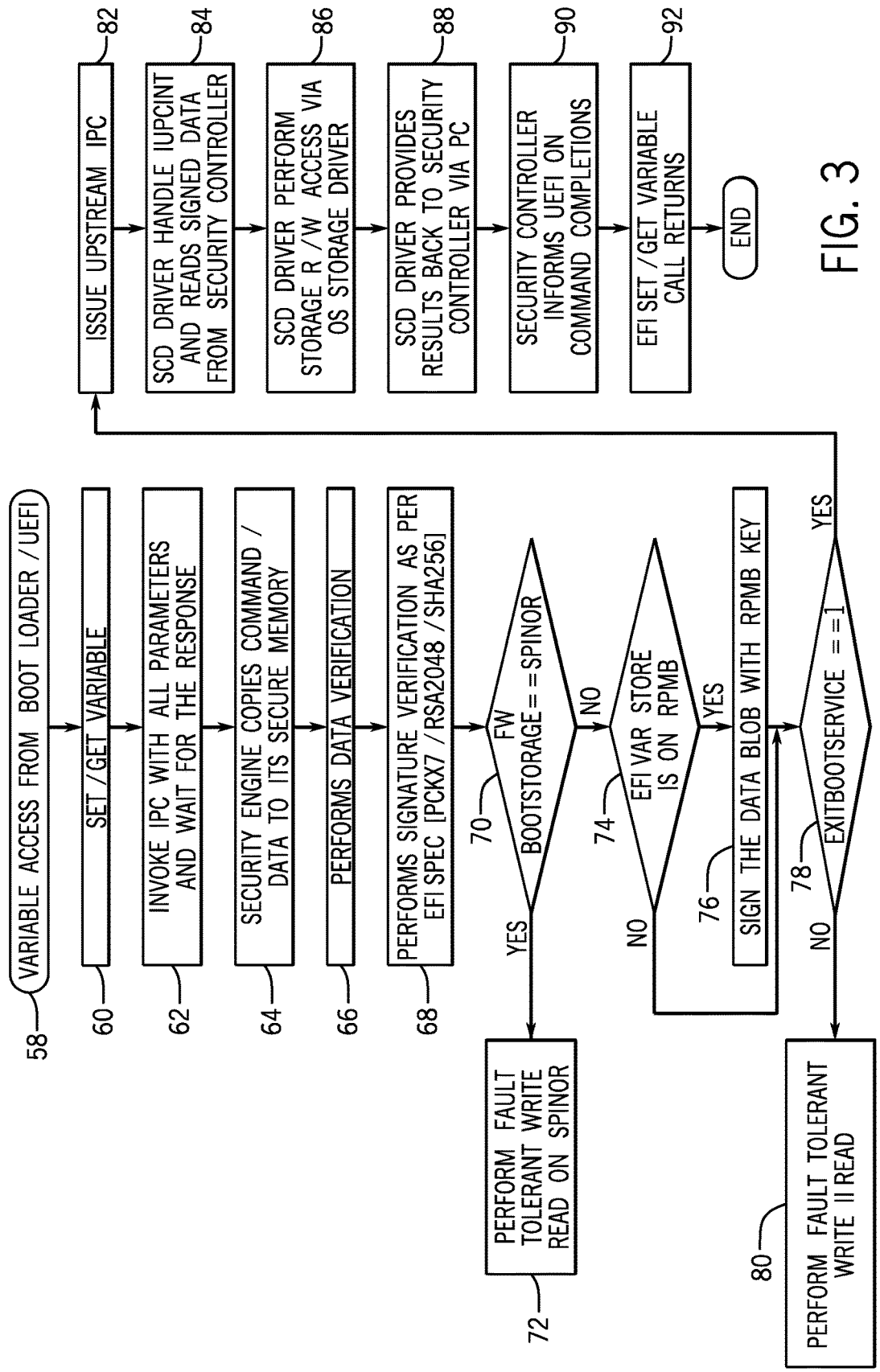
FIG. 3 is a flow chart for one embodiment.

The sequence 58 shown in FIG. 3 may be implemented in software, firmware and/or hardware. In software and firmware embodiments it may be implemented by computer executed instructions stored in one or more non-transitory computer readable media such as magnetic, optical or semiconductor storage.

The sequence (as an example embodiment) enables variable access from boot loader to UEFI. The sequence begins with block 60 with the SetVariable/GetVariable. Then at block 62, an inter process communication channel is invoked with all parameters and then the flow waits for a response as indicated. In block 64 the EFI variable handler 38 (FIG. 2) copies command and/or data to its secure memory 20 (FIG. 2).

In block 66 data verification is performed. In block 68, signature verification is performed pursuant to the EFI specification. Thereafter, a check at diamond 70 determines whether the firmware boot storage is in the Serial Peripheral Interface NOR Memory (SPINOR) mode. If so, fault tolerant write and read on SPINOR is performed at block 72. If not, a check at diamond 74 determines if the EFI variable storage is on Replay Protection Memory Block (RPMB). If so, the data blob is signed with the RPMB key (block 76). If not, that step is skipped.

Then in diamond 78 a check determines whether the EXITBOOTSERVICE state is one. If not, (i.e. firmware not OS is in control) as indicated in block 80 you perform fault tolerant write and read adapted to the selected memory technology. If so, you proceed to issue an upstream IPC in block 82. Then the secure TEE driver 28 (FIG. 2) handles a inter process interrupt (IUPCINT) and it reads signed data from the TEE as indicated in block 84. In block 86, the secure TEE driver performs a storage read/write access via the OS storage driver. Next in block 88 the secure driver provides the results back to the TEE via an inter process communication channel. Then in block 90 the TEE's controller informs UEFI on communication and completion. Then the EFI Set/GetVariable call returns as indicated in block 92.

The standard secure boot protocol of the UEFI standard may utilize a microcontroller separate from the host processor on the platform. The microcontroller may have active management technology (AMT) capabilities, such as Intel® Active Management Technology (iAMT) capabilities, as well as having out-of-band (OOB) communication capabilities, hereinafter referred to as an out-of-band (OOB) microcontroller, or also interchangeably referred to as a manageability engine (ME) control or iAMT. InterActive Management Technology (iAMT) is described at URL www.*intel*technology/manage/iamt/. By utilizing the OOB capabilities of the microcontroller, certificates and keys may be compared with authenticated web sites or bulletin boards accessible via an OOB connection, typically on the public Internet. During boot, the certificates and keys may be validated by the OOB microcontroller.

Figure 4:
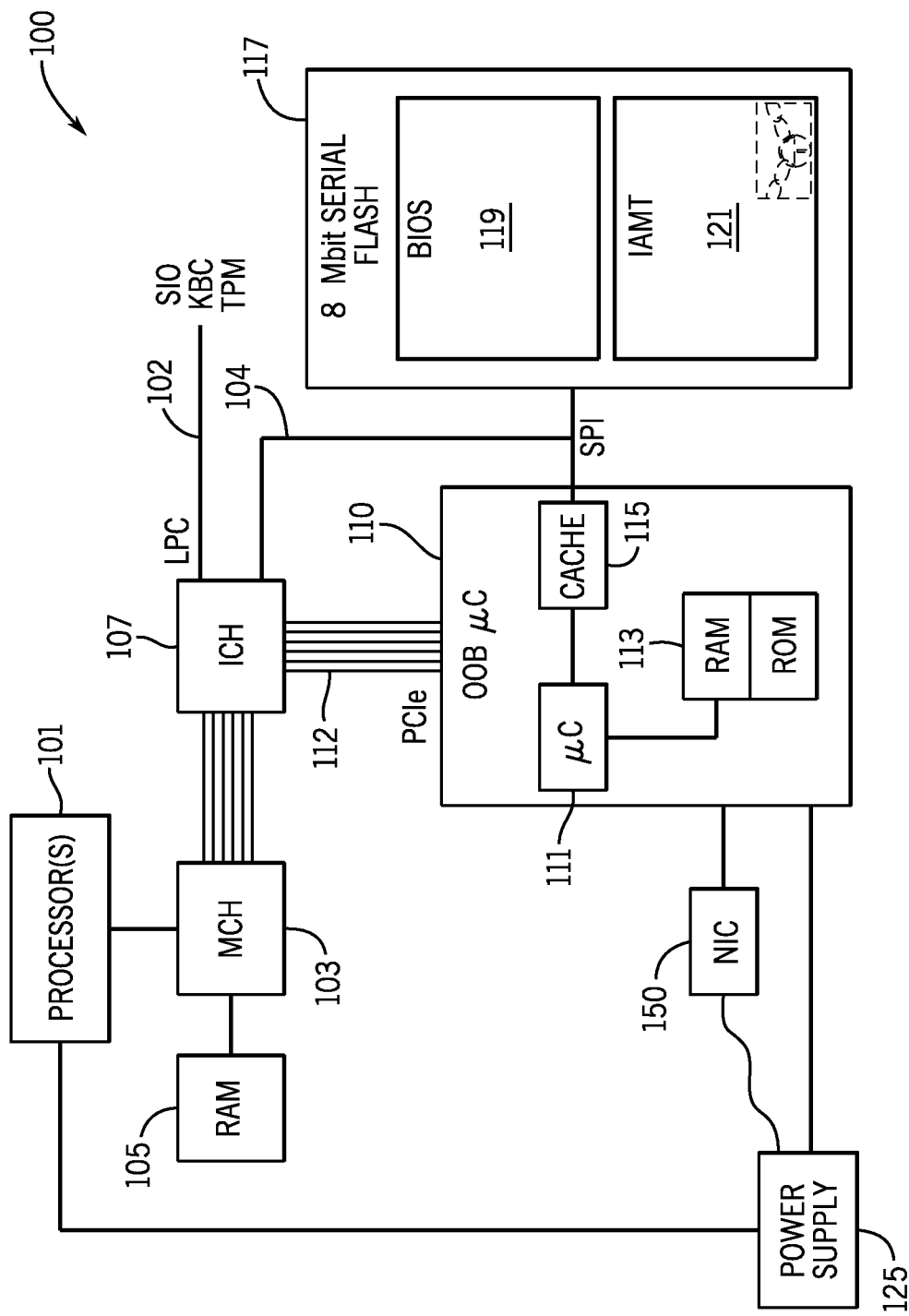
FIG. 4 is a system diagram for one embodiment.

FIG. 4 is a block diagram illustrating features of an exemplary out-of-band microcontroller (OOB microcontroller) useful for implementing the TEE, according to an embodiment of the environment. Embodiments of this system topology have an added network connection, such as a network interface card (NIC) 150. NIC 150 may be used for OOB platform manageability and communication. In an embodiment, the OOB microcontroller support may enable managing of the system without perturbing the performance of the system.

A platform 100 comprises a processor 101. The processor 101 may be connected to random access memory 105 via a memory controller hub 103. Processor 101 may be any type of processor capable of executing software, such as a microprocessor, digital signal processor, microcontroller, or the like. Though FIG. 4 shows only one such processor 101, there may be one or more processors in the platform 100 and one or more of the processors may include multiple threads, multiple cores, or the like.

The processor 101 may be further connected to I/O devices via an input/output controller hub (ICH) 107. The ICH may be coupled to various devices, such as a super I/O controller (SIO), keyboard controller (KBC), or trusted platform module (TPM) via a low pin count (LPC) bus 102. The SIO, for instance, may have access to floppy drives or industry standard architecture (ISA) devices (not shown). In an embodiment, the ICH 107 is coupled to non-volatile memory 117 via a serial peripheral interface (SPI) bus 104. The non-volatile memory 117 may be flash memory or static random access memory (SRAM), or the like. An out-of-band (OOB) microcontroller 110 may be present on the platform 100. The OOB microcontroller 110 may connect to the ICH 107 via a bus 112, typically a peripheral component interconnect (PCI) or PCI express (PCIe) bus. The OOB microcontroller 110 may also be coupled with the non-volatile memory store (NV store) 117 via the SPI bus 104. The NV store 117 may be flash memory or static RAM (SRAM), or the like. In many existing systems, the NV store is flash memory.

The OOB microcontroller 110 may be likened to a "miniature" processor. Like a full capability processor, the OOB microcontroller has a processor unit 111 which may be operatively coupled to a cache memory 115, as well as RAM and ROM memory 113. The OOB microcontroller may have a built-in network interface 150 and independent connection to a power supply 125 to enable out-of-band communication even when the in-band processor 101 is not active, or fully booted.

In embodiments, the processor has a basic input output system (BIOS) 119 in the NV store 117. In other embodiments, the processor boots from a remote device (not shown) and the boot vector (pointer) resides in the BIOS portion 119 of the NV store 117. The OOB microcontroller 110 may have access to all of the contents of the NV store 117, including the BIOS portion 119 and a protected portion 121 of the non-volatile memory. In some embodiments, the protected portion 121 of memory may be secured with Intel® Active Management Technology (iAMT).

The OOB microcontroller may be coupled to the platform to enable SMBUS commands. The OOB microcontroller may also be active on the PCIe bus. An integrated device electronics (IDE) bus may connect to the PCIe bus. In an embodiment, the SPI 104 is a serial interface used for the ICH 107 to communicate with the flash 117. The OOB microcontroller may also communicate to the flash via the SPI bus. In some embodiments, the OOB microcontroller may not have access to one of the SPI bus or other bus.

The portion of NV memory 121 that is available only to the OOB microcontroller may be used to securely store certificates, keys and signatures that are inaccessible by the BIOS, firmware or operating system. The NIC 150 may be used to access the Internet, bulletin board or other remote system to validate keys and certificates stored in the NV memory 121. Without the use of the out-of-band communication, revocation and validation are not possible using the system firmware at boot time because no network connectivity exists until the host processor's drivers have been initialized. The OOB microcontroller can access the remote system early during boot of the host processor 101 on the platform to validate drivers and loaders to be used to fully boot the platform. The remote system may identify a specific certificate as being out of date or revoked. Without the ability to revoke the certificate prior to boot, the platform is vulnerable to counterfeit loaders, etc. The OOB microcontroller may identify revoked certificates from the remote system, for instance on a certificate revocation list (CRL), and mark them accordingly in the NV storage 121. Thus, upon boot a revoked certificate will not authenticate a counterfeit or out of date module, in error.

In some embodiments, the OOB microcontroller is a manageability engine (ME) controller. The ME controller, also known simply as the manageability engine (ME), may be integrated into the platform. In some embodiments, the ME may perform other manageability functions, also known as iAMT capabilities. However, this functionality is not required to practice embodiments of the invention, as described herein. For purposes of this discussion, the terms ME and iAMT controller refer to the physical controller and not to the capabilities of the platform. The ME can typically access the chipset registers through internal data paths or system bus (SMBUS) or PCI accessors.

The following clauses and/or examples pertain to further embodiments:

One example embodiment may be a computer implemented method comprising providing a dynamic firmware module loader to load and unload modules as needed from a storage containerized within a trusted execution environment, and accessing the environment via an inter process communication channel rather than using a system management mode. The method may also include abstracting storage on platform boot media, allowing different types of storage without using multiple storage drivers in system management mode. The method may also include providing secure storage within said trusted execution environment. The method may also include enabling the trusted execution environment to copy contents from platform visible memory to secure memory within the trusted execution environment. The method may also include verifying data passed to said secure memory and ensuring data is accessible for a current execution context. The method may also include ensuring data is persistently stored in said environment across a power failure or reboots. The method may also include determining when control is transferred from firmware to an operating system. The method may also include directly updating platform visible memory using a trusted execution environment storage driver before control is transferred to the operating system. The method may also include after transferring control to the operating system, triggering an upstream inter process communication channel to a secure trusted execution environment driver that calls an operating system storage driver to access the platform visible storage. The method may also include using the modules to provide storage or access driver capabilities to be run in a containerized environment.

Another example embodiment may be one or more non-transitory computer readable media storing instructions executed by a processor to perform a sequence comprising providing a containerized storage within a trusted execution environment, providing a dynamic firmware module loader to load and unload modules as needed from said storage, and accessing the environment via an inter process communication channel rather than using a system management mode. The media may further store said sequence including abstracting storage on platform boot media, allowing different types of storage without using multiple storage drivers in system management mode. The media may further store said sequence including providing secure storage within said trusted execution environment. The media may further store said sequence including enabling the trusted execution environment to copy contents from platform visible memory to secure memory within the trusted execution environment. The media may further store said sequence including verifying data passed to said secure memory and ensuring data is accessible for a current execution context. The media may further store said sequence including ensuring data is persistently stored in said environment across a power failure or reboots. The media may further store said sequence including determining when control is transferred from firmware to an operating system. The media may further store said sequence including directly updating platform visible memory using a trusted execution environment storage driver before control is transferred to the operating system. The media may further store said sequence including after transferring control to the operating system, triggering an upstream inter process communication channel to a secure trusted execution environment driver that calls an operating system storage driver to access the platform visible storage.

In another example embodiment may be an apparatus comprising a secure storage within a trusted execution environment, and a hardware processor to implement the trusted execution environment and to provide dynamic firmware module loader to load and unload modules as needed from the storage and to access the environment via an inter process communication channel rather than using a system management mode. The apparatus may include said processor to abstract storage on platform boot media, allowing different types of storage without using multiple storage drivers in system management mode. The apparatus may include said processor to enable the trusted execution environment to copy contents from platform visible memory to the secure memory within the trusted execution environment. The apparatus may include said processor to verify data passed to said secure memory and ensuring data is accessible for a current execution context. The apparatus may include said processor to ensure data is persistently stored in said environment across a power failure or reboots. The apparatus may include said processor to determine when control is transferred from firmware to an operating system. The apparatus may include said processor to directly update platform visible memory using a trusted execution environment storage driver before control is transferred to the operating system. The apparatus may include after transferring control to the operating system, said processor to trigger an upstream inter process communication channel to a secure trusted execution environment driver that calls an operating system storage driver to access the platform visible storage.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A computer implemented method comprising:
   providing a dynamic firmware module loader within a trusted execution environment to load and unload modules, before booting is complete, as needed from a storage containerized within a trusted execution environment including a processor within the trusted execution environment;
   providing an external processor and operating system outside the trusted execution environment;
   accessing the trusted execution environment before booting via an inter process communication channel rather than using a system management mode; and
   abstracting storage on platform boot media, allowing different types of storage without using a storage driver for each type of storage.

2. The method of claim 1 including providing secure storage within said trusted execution environment.

3. The method of claim 2 including enabling the trusted execution environment to copy contents from platform visible memory to secure memory within the trusted execution environment.

4. The method of claim 3 including verifying data passed to said secure memory and ensuring data is accessible for a current execution context.

5. The method of claim 4 including ensuring data is persistently stored in said trusted execution environment across a power failure or reboots.

6. The method of claim 1 including determining when control is transferred from firmware to an operating system.

7. The method of claim 6 including directly updating platform visible memory using a trusted execution environment storage driver before control is transferred to the operating system.

8. The method of claim 7 including after transferring control to the operating system, triggering an upstream inter process communication channel, with no dependency on use of a system management mode, to a secure trusted execution environment driver that calls an operating system storage driver to access the platform visible storage.

9. The method of claim 1 including using the modules to provide storage or access driver capabilities to be run in a containerized environment.

10. One or more non-transitory computer readable media storing instructions executed by a processor to perform a sequence comprising:
    providing a containerized storage within a trusted execution environment including a processor within the trusted execution environment;
    providing a dynamic firmware module loader within a trusted execution environment to load and unload modules, before booting is complete, as needed from said containerized storage;
    providing an external processor and operating system outside the trusted execution environment;
    accessing the trusted execution environment before booting via an inter process communication channel rather than using a system management mode; and
    abstracting storage on platform boot media, allowing different types of storage without using a storage driver for each type of storage.

11. The media of claim 10, said sequence including providing secure storage within said trusted execution environment.

12. The media of claim 11, said sequence including enabling the trusted execution environment to copy contents from platform visible memory to secure memory within the trusted execution environment.

13. The media of claim 12, said sequence including verifying data passed to said secure memory and ensuring data is accessible for a current execution context.

14. The media of claim 13, said sequence including ensuring data is persistently stored in said environment across a power failure or reboots.

15. The media of claim 10, said sequence including determining when control is transferred from firmware to an operating system.

16. The media of claim 15, said sequence including directly updating platform visible memory using a trusted execution environment storage driver before control is transferred to the operating system.

17. The media of claim 16, said sequence including after transferring control to the operating system, triggering an upstream inter process communication channel with no dependency on use of a system management mode to a secure trusted execution environment driver that calls an operating system storage driver to access the platform visible storage.

18. An apparatus comprising:
a trusted execution environment;
a secure storage within the trusted execution environment;
processor within the trusted execution environment; and
a hardware processor to implement the trusted execution environment and to provide dynamic firmware module loader within a trusted execution environment to load and unload modules, before booting is complete, as needed from the secure storage, provide an external processor and operating system outside the trusted execution environment, and to access the trusted execution environment before booting via an inter process communication channel rather than using a system management mode, and abstract storage on the secure storage, allowing different types of storage without using a storage driver for each type of storage.

19. The apparatus of claim 18, said processor to enable the trusted execution environment to copy contents from platform visible memory to the secure memory within the trusted execution environment.

20. The apparatus of claim 19, said processor to verify data passed to said secure memory and ensuring data is accessible for a current execution context.

21. The apparatus of claim 20, said processor to ensure data is persistently stored in said environment across a power failure or reboots.

22. The apparatus of claim 18, said processor to determine when control is transferred from firmware to an operating system.

23. The apparatus of claim 22, said processor to directly update platform visible memory using a trusted execution environment storage driver before control is transferred to the operating system.

24. The apparatus of claim 23, after transferring control to the operating system, said processor to trigger an upstream inter process communication channel with no dependency on use of a system management mode to a secure trusted execution environment driver that calls an operating system storage driver to access the platform visible storage.

* * * * *